(12) United States Patent
Deshpande

(10) Patent No.: US 11,017,375 B2
(45) Date of Patent: May 25, 2021

(54) SYSTEMS AND METHODS FOR USING AN INTERNET OF THINGS DEVICE PRESENCE TO AUTHENTICATE A CARDHOLDER FOR A FINANCIAL TRANSACTION

(71) Applicant: MasterCard International Incorporated, Purchase, NY (US)

(72) Inventor: Rahul Arun Deshpande, Chesterfield, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 1340 days.

(21) Appl. No.: 14/814,348

(22) Filed: Jul. 30, 2015

(65) Prior Publication Data

US 2017/0032356 A1    Feb. 2, 2017

(51) Int. Cl.
*G06Q 20/40* (2012.01)
*G06Q 20/32* (2012.01)

(52) U.S. Cl.
CPC ....... *G06Q 20/3224* (2013.01); *G06Q 20/409* (2013.01)

(58) Field of Classification Search
USPC ....................................................... 705/38, 44
See application file for complete search history.

(56) References Cited

U.S. PATENT DOCUMENTS

| | | | | |
|---|---|---|---|---|
| 2003/0200184 A1* | 10/2003 | Dominguez | ....... | G06Q 20/3674 705/78 |
| 2010/0057623 A1* | 3/2010 | Kapur | ................ | G06Q 20/3224 705/72 |
| 2011/0238474 A1* | 9/2011 | Carr | ................... | G06Q 30/0259 705/14.23 |
| 2013/0041997 A1 | 2/2013 | Li et al. | | |
| 2013/0042244 A1 | 2/2013 | Li et al. | | |
| 2013/0046983 A1 | 2/2013 | Zhu et al. | | |

(Continued)

FOREIGN PATENT DOCUMENTS

| | | |
|---|---|---|
| JP | 2009289063 A | 12/2009 |
| WO | 2011091728 A1 | 8/2011 |

OTHER PUBLICATIONS

"International Search Report Issued in PCT Application No. PCT/US2016/044398", dated Nov. 1, 2016, 5 Pages.

(Continued)

*Primary Examiner* — Alexander G Kalinowski
*Assistant Examiner* — Hatem M Ali

(57) ABSTRACT

Examples of the disclosure enable a user to be authenticated and/or a financial transaction to be authorized. In some examples, one or more identifiers associated with one or more detected devices in an area proximate to the detection device are received. It is determined whether at least one identifier of the one or more identifiers corresponds with one or more target identifiers, and whether a device presence of at least one device associated with the at least one identifier satisfies a predetermined threshold. The user is authenticated upon determining that the device presence satisfies the predetermined threshold. Aspects of the disclosure provide for a processing system to authenticate a user and/or authorize a financial transaction in an environment including a plurality of devices.

20 Claims, 10 Drawing Sheets

(56) References Cited

U.S. PATENT DOCUMENTS

| | | | |
|---|---|---|---|
| 2015/0067890 A1* | 3/2015 | Bataller | G06F 21/6218 |
| | | | 726/28 |
| 2015/0161375 A1* | 6/2015 | Ghosh | G06F 21/36 |
| | | | 726/7 |
| 2015/0201022 A1 | 7/2015 | Kim et al. | |
| 2015/0332258 A1* | 11/2015 | Kurabi | G06Q 20/3278 |
| | | | 705/71 |
| 2016/0012412 A1* | 1/2016 | Scanlon | G06Q 20/3224 |
| | | | 705/44 |
| 2016/0125412 A1* | 5/2016 | Cannon | G06Q 20/4014 |
| | | | 705/44 |
| 2017/0164159 A1* | 6/2017 | Mycek | H04W 4/21 |

OTHER PUBLICATIONS

"Written Opinion Issued in PCT Application No. PCT/US2016/044398", dated Nov. 1, 2016, 4 Pages.

* cited by examiner

| Financial Transaction Device 240 | Financial Transaction Processing Computing Device 200 | Detection Device 250 |
|---|---|---|
| | | Scan area for one or more devices |
| | | Identify one or more identifiers associated with the one or more scanned devices |
| | | Transmit the one or more identifiers |
| | Receive the one or more identifiers | |
| | Identify the one or more identifiers as one or more target identifiers | |

FIG. 6

| Financial Transaction Device 240 | Financial Transaction Processing Computing Device 200 | Detection Device 250 |
|---|---|---|
| Receive financial transaction request | | |
| Transmit authorization request | | |
| | Receive the authorization request | |
| | Transmit a scan request | |
| | | Receive the scan request |
| | | Scan area for one or more devices |
| | | Identify one or more identifiers associated with the one or more scanned devices |
| | | Transmit the one or more identifiers |
| | Receive the one or more identifiers | |
| | Determine whether the one or more identifiers correspond with one or more target identifiers | |
| | Determine whether a device presence of the one or more devices satisfies a threshold | |
| | Authorize the financial transaction | |
| | Transmit data indicating the authorization | |
| Receive the data indicating the authorization | | |
| Process the financial transaction request | | |

FIG. 7

| Financial Transaction Processing Computing Device 200 | Detection Device 810 |
|---|---|
|  | Scan area for one or more devices |
|  | Identify one or more identifiers associated with the one or more scanned devices |
|  | Transmit the one or more identifiers |
| Receive the one or more identifiers |  |
| Identify the one or more identifiers as one or more target identifiers |  |

FIG. 9

| Financial Transaction Processing Computing Device 200 | Detection Device 810 |
|---|---|
|  | Receive financial transaction request |
|  | Transmit authorization request |
| Receive the authorization request |  |
| Transmit a scan request |  |
|  | Receive the scan request |
|  | Scan area for one or more devices |
|  | Identify one or more identifiers associated with the one or more scanned devices |
|  | Transmit the one or more identifiers |
| Receive the one or more identifiers |  |
| Determine whether the one or more identifiers correspond with one or more target identifiers |  |
| Determine whether a device presence of the one or more devices satisfies a threshold |  |
| Authorize the financial transaction |  |
| Transmit data indicating the authorization |  |
|  | Receive the data indicating the authorization |
|  | Process the financial transaction request |

FIG. 10

SYSTEMS AND METHODS FOR USING AN INTERNET OF THINGS DEVICE PRESENCE TO AUTHENTICATE A CARDHOLDER FOR A FINANCIAL TRANSACTION

FIELD OF THE DISCLOSURE

The subject matter described herein relates generally to information processing and, more specifically, to using an Internet of Things (IoT) device presence to authenticate a user or authorize a financial transaction.

BACKGROUND

Financial transaction cards have made great gains as a means to attract financial accounts to financial institutions and, in the case of credit cards, as a medium to create small loans and generate interest income for financial institutions. However, fraudulent financial transactions involving credit cards and other similar payment mechanisms may result in huge losses for cardholders, merchants, banks, and other financial institutions.

SUMMARY

Embodiments of the disclosure enable a user to be authenticated and/or a financial transaction to be authorized based on an Internet of Things (IoT) device presence. In one aspect, a method is provided for authenticating a cardholder for a financial transaction. The method includes receiving, from a detection device, one or more identifiers associated with one or more devices in an area proximate to the detection device, determining, at a financial transaction processing computing device, whether at least one of the received identifiers corresponds with one or more target identifiers, determining, at the financial transaction processing computing device, whether a device presence of at least one device of the one or more devices satisfies a predetermined threshold upon determining that the at least one of the received identifiers corresponds with the one or more target identifiers, and authenticating the cardholder for the financial transaction upon determining that the device presence satisfies the predetermined threshold. The at least one device is associated with the at least one of the received identifiers that corresponds with the one or more target identifiers.

In another aspect, a computing device configured to authenticate a cardholder for a financial transaction is provided. The computing device includes a memory storing data associated with one or more target identifiers and computer-executable instructions, and a processor configured to execute the computer-executable instructions to receive, from a detection device, one or more identifiers associated with one or more devices in an area proximate to the detection device, determine whether at least one of the received identifiers corresponds with the one or more target identifiers, determine whether a device presence of at least one device of the one or more devices satisfies a predetermined threshold upon determining that the at least one of the received identifiers corresponds with the one or more target identifiers, authenticate the cardholder for the financial transaction upon determining that the device presence satisfies the predetermined threshold, and transmit data indicating an authorization of the financial transaction upon authenticating the cardholder for the financial transaction. The at least one device is associated with the at least one of the received identifiers that corresponds with the one or more target identifiers.

In yet another aspect, a computer-readable storage device having computer-executable instructions embodied thereon is provided. Upon execution by at least one processor, the computer-executable instructions cause the processor to receive an authorization request to authorize a financial transaction, transmit, to a detection device, a scan request to scan an area proximate to the detection device to detect one or more devices upon receiving the authorization request, receive, from the detection device, one or more identifiers associated with the one or more detected devices, determine whether at least one of the received identifiers corresponds with the one or more target identifiers, determine whether a device presence of at least one device of the one or more devices satisfies a predetermined threshold upon determining that the at least one of the received identifiers corresponds with the one or more target identifiers, and authenticate a cardholder for the financial transaction upon determining that the device presence satisfies the predetermined threshold. The at least one device is associated with the at least one of the received identifiers that corresponds with the one or more target identifiers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 6 and 7 are example sequence diagrams that may be implemented using a system, such as the system shown in FIG. 5.

FIGS. 9 and 10 are example sequence diagrams that may be implemented using a system, such as the system shown in FIG. 8.

Corresponding reference characters indicate corresponding parts throughout the drawings.

DETAILED DESCRIPTION

Figure 1:
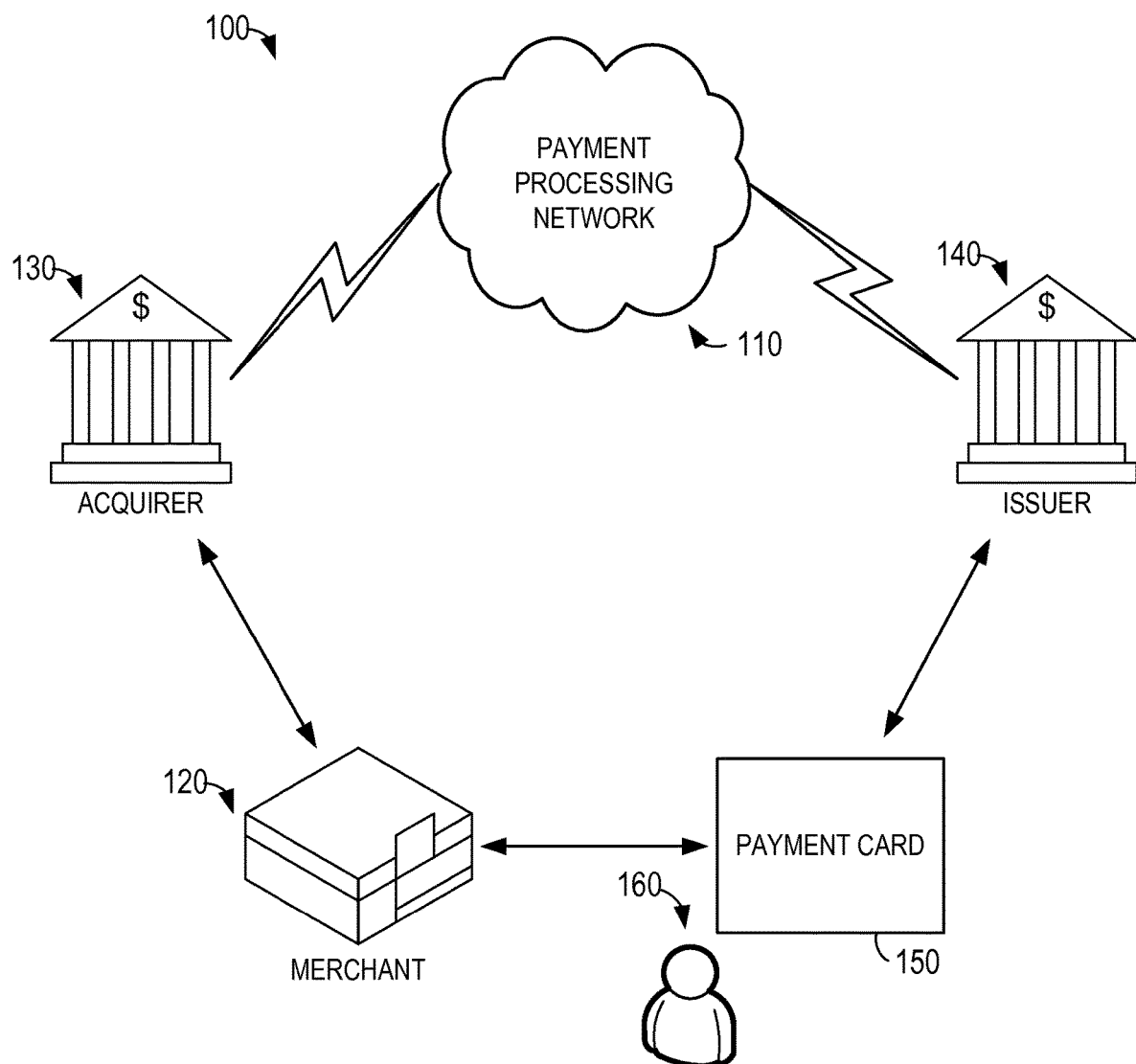
FIG. 1 is a block diagram illustrating an example environment for processing financial transactions.

The subject matter described herein relates generally to information processing and, more specifically, to using an IoT device presence to authenticate a user or to authorize a financial transaction. Embodiments of the disclosure provide the ability to identify a location of a user based on the devices around the user to authenticate the user or authorize a financial transaction, thereby providing at least some additional protection from fraudulent financial transactions. Embodiments described herein enable a computer system to receive one or more identifiers associated with one or more detected devices in an area proximate to a detection device, determine whether at least one identifier of the one or more identifiers corresponds with one or more target identifiers, determine whether a device presence of at least one device of the one or more devices associated with the at least one identifier satisfies a predetermined threshold, authenticate the user, and transmit data indicating an authenticating of the user.

Aspects of the disclosure provide for a processing system to authenticate a user and/or authorize a financial transaction in an environment including a plurality of devices coupled to each other via a network (e.g., the Internet). For example, a financial transaction processing computing device may determine whether one or more devices detected by a detection device correspond with one or more devices recognized by the financial transaction processing computing device. The user may be authenticated and/or the financial transaction may be authorized based on a quantity and/or quality of recognized devices proximate to the detection device. In this way, there is at least some confidence that the detection device is in a familiar location or environment including one or more devices recognized by the financial transaction processing computing device.

The methods and systems described herein may be implemented using computer programming or engineering techniques including computer software, firmware, hardware or a combination or subset thereof. At least one technical problem with known security mechanisms is that they are directed to the payment card. The systems and methods described herein address that technical problem. For example, by processing financial transactions in the manner described in this disclosure, some embodiments improve security of processing financial transactions by using an IoT device presence to authenticate a user or authorize a financial transaction, enhance reliability of financial transaction data by improving security of processing financial transactions, improve user efficiency via user interface interaction, and/or reduce error rate by automating the security of processing of financial transactions.

The technical effect of the systems and processes described herein is achieved by performing at least one of the following operations: a) receiving an authorization request to authorize a financial transaction; b) transmitting a scan request to scan an area proximate to a detection device; c) identifying a transaction device identifier as a target identifier of one or more target identifiers; d) receiving one or more initialization identifiers; e) identifying the one or more initialization identifiers as the one or more target identifiers; f) receiving one or more identifiers associated with one or more devices in the area proximate to the detection device; g) determining whether at least one identifier of the one or more identifiers corresponds with the one or more target identifiers; h) determining whether a device presence of at least one device of the one or more devices associated with the at least one identifier satisfies a predetermined threshold; i) calculating a parameter associated with the at least one identifier; j) calculating a first parameter associated with a first identifier of the at least one identifier; k) determining whether the calculated parameter satisfies the predetermined threshold; l) authenticating a cardholder for the financial transaction; and m) transmitting data indicating an authorization of the financial transaction.

FIG. 1 is a block diagram illustrating an example system or environment 100 for processing financial transactions. The environment 100 includes a processing network 110, such as the MasterCard® brand payment processing network (MasterCard® is a registered trademark of MasterCard International Incorporated located in Purchase, N.Y.). The MasterCard® brand payment processing network is a propriety network for exchanging financial transaction data between members of the MasterCard® brand payment processing network.

The environment 100 includes one or more merchants 120 that accept payment via the processing network 110. To accept payment via the processing network 110, the merchant 120 establishes a financial account with an acquirer 130 that is a member of the processing network 110. The acquirer 130 is a financial institution that maintains a relationship with one or more merchants 120 to enable the merchants 120 to accept payment via the processing network 110. The acquirer 130 may also be known as an acquiring bank, a processing bank, or a merchant bank.

The environment 100 includes one or more issuers 140 that issue or provide payment cards 150 (e.g., credit card, debit card, prepaid card, and the like) or other payment products to one or more cardholders 160 or, more broadly, account holders ("cardholder" and "account holder" may be used interchangeably herein). The issuer 140 is a financial institution that maintains a relationship with one or more cardholders 160 to enable the cardholders 160 to make a payment using the payment card 150 via the processing network 110.

A cardholder 160 uses a payment product, such as a payment card 150, to purchase a good or service from a merchant 120. In some examples, the payment card 150 is linked or associated with electronic wallet technology or contactless payment technology, such as a radio frequency identification (RFID)-enabled device, a Bluetooth® brand wireless technology-enabled device, a ZigBee® brand communication-enabled device, a Wi-Fi® brand local area wireless computing network-enabled device, a near field communication (NFC) wireless communication-enabled device, and/or any other device that enables the payment card 150 to purchase a good or service from a merchant 120. (Bluetooth® is a registered trademark of Bluetooth Special Interest Group, ZigBee® is a registered trademark of the ZigBee Alliance, and Wi-Fi® is a registered trademark of the Wi-Fi Alliance). The cardholder 160 may use any payment product that is linked or associated with a corresponding financial account maintained by an issuer 140. As described herein, the term "payment card" includes credit cards, debit cards, prepaid cards, digital cards, smart cards, and any other payment product that is linked or associated with a corresponding financial account maintained by an issuer 140. Payment cards 150 may have any shape, size, or configuration that enables the environment 100 to function as described herein.

A cardholder 160 may present the merchant 120 with a payment card 150 to make a payment to the merchant 120 in exchange for a good or service. Alternatively, the cardholder 160 may provide the merchant 120 with account information associated with the payment card 150 without physically presenting the payment card 150 (e.g., for remote financial transactions, including e-commerce transactions, card-not-present transactions, or card-on-file transactions). Account information may include a name of the cardholder 160, an account number, an expiration date, a security code (such as a card verification value (CVV), a card verification code (CVC), and the like), and/or a personal identification number (PIN).

The merchant 120 requests authorization from an acquirer 130 for at least the amount of the purchase. For example, the merchant 120 may request authorization through a point-ofsale (POS) terminal, which reads account information of the cardholder 160 from a microchip or magnetic stripe on the payment card 150, and transmits the cardholder's account information to one or more financial transaction processing computing devices of the acquirer 130. For another example, the POS terminal reads account information of the cardholder 160 from a device configured to communicate with the POS terminal using contactless payment technology, and transmits the cardholder's account information to one or more financial transaction processing computing devices of the acquirer 130.

Using the processing network 110, the financial transaction processing computing devices of the acquirer 130 communicate with one or more financial transaction processing computing devices of an issuer 140 to determine whether the account information of the cardholder 160 matches or corresponds with the account information of the issuer 140, whether the account is in good standing, and/or whether the purchase is covered by (e.g., less than) a credit line or account balance associated with the financial account. Based on these determinations, the financial transaction processing computing devices of the issuer 140 determine whether to approve or decline the request for authorization from the merchant 120.

If the request for authorization is declined, the merchant 120 is notified as such, and may request authorization from the acquirer 130 for a lesser amount or request an alternative form of payment from the cardholder 160. If the request for authorization is approved, an authorization code is issued to the merchant 120, and the cardholder's available credit line or account balance is decreased. The financial transaction is then settled between the merchant 120, the acquirer 130, the issuer 140, and/or the cardholder 160. Settlement typically includes the acquirer 130 reimbursing the merchant 120 for selling the good or service, and the issuer 140 reimbursing the acquirer for reimbursing the merchant 120. When a credit card is used, the issuer 140 may bill the cardholder 160 to settle a financial account associated with the cardholder 160. When a debit or prepaid card is used, the issuer 140 may automatically withdraw funds from the account.

Figure 2:
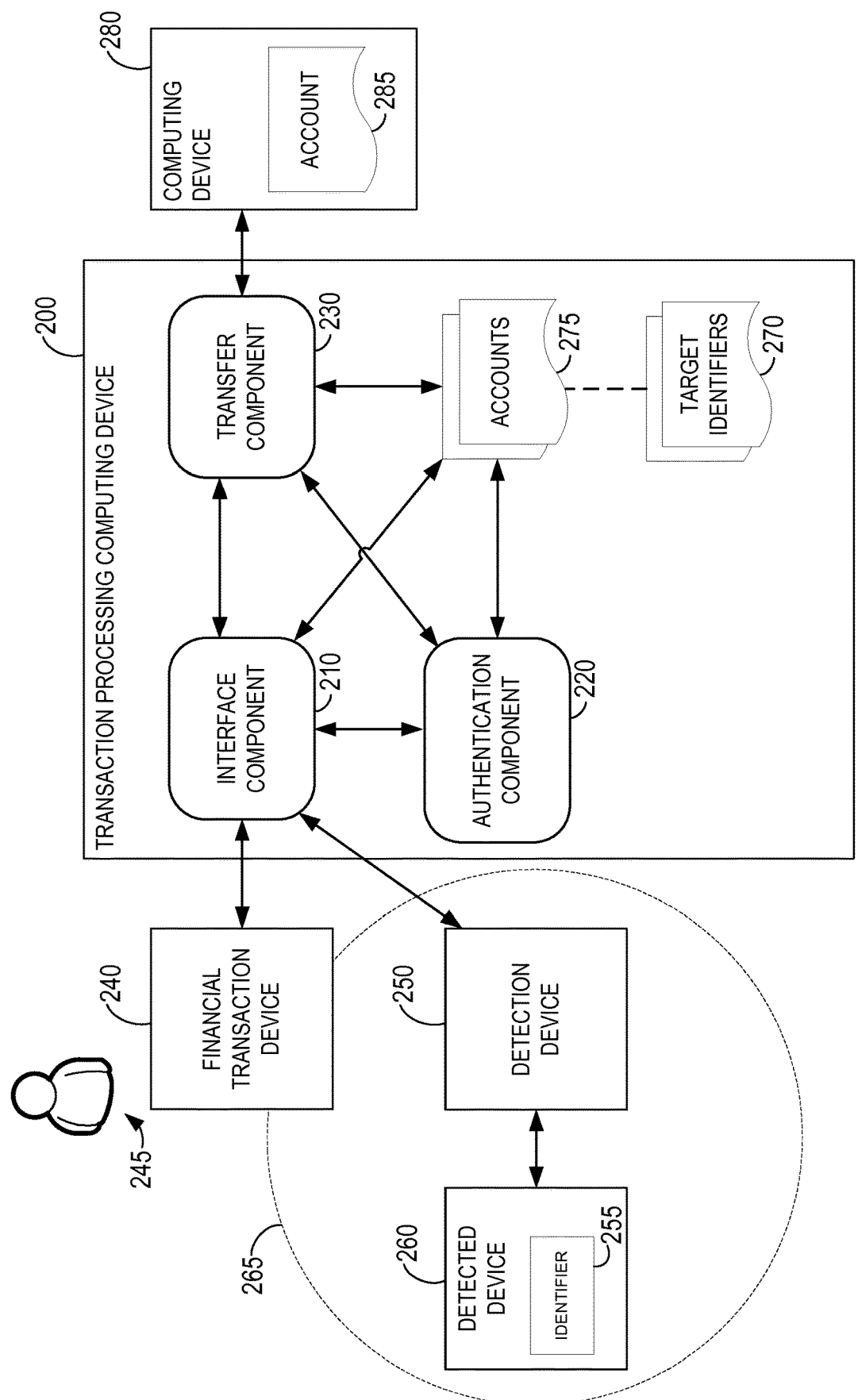
FIG. 2 is a block diagram illustrating example modules that may be used to process financial transactions in an environment, such as the environment shown in FIG. 1.

FIG. 2 is a block diagram illustrating example modules that may be used to process financial transactions in the environment 100 (shown in FIG. 1) using a financial transaction processing computing device 200. In some embodiments, the financial transaction processing computing device 200 is associated with the issuer 140. Alternatively, the financial transaction processing computing device 200 may be associated with any entity that enables the environment 100 to function as described herein. The financial transaction processing computing device 200 includes an interface component 210, an authentication component 220, and/or a transfer component 230.

The interface component 210 is configured to receive data from and/or transmit data to another device, such as a financial transaction device 240. For example, the interface component 210 may receive, from the financial transaction device 240, an authorization request to authorize a financial transaction, and transmit, to the financial transaction device 240, data indicating an approval or declination of the financial transaction.

The financial transaction device 240 may be a POS terminal, a mobile device, a tablet, a laptop, a desktop computer, and/or any other computing device that allows a user 245 (e.g., a cardholder 160) to make a payment to the merchant 120 with a payment card 150 and/or with account information associated with the payment card 150. For example, the user 245 may present the payment card 150 to a merchant 120, who uses the financial transaction device 240 to transmit an authorization request to the interface component 210. For another example, the user 245 may enter account information associated with the payment card 150 at a desktop computer, which transmits an authorization request to the interface component 210.

Additionally or alternatively, the interface component 210 is configured to receive data from and/or transmit data to a detection device 250. For example, the interface component 210 may transmit a scan request to the detection device 250, and receive, from the detection device 250, one or more identifiers 255 associated with one or more devices 260 detected by the detection device 250. One or more devices 260 are associated with a unique identifier 255 (e.g., serial number, media access control (MAC) address, Internet Protocol (IP) address, and the like) that uniquely identifies the device 260. In at least some embodiments, a unique identifier 255 is generated for one or more devices 260 using a secret key stored on the detection device 250 and/or the financial transaction processing computing device 200.

The detection device 250 may be a scanner, a dongle, a fob, a key fob, a mobile device, a tablet, a laptop, a desktop computer, and/or any other computing or peripheral device configured to scan an area 265 proximate to the detection device 250 to detect one or more devices 260. That is, the detection device 250 surveys or searches the area 265 for one or more devices 260 such that the one or more devices 260 physically located within the area 265 are detected by the detection device 250. As used herein, the term "proximate" includes being at, adjacent, or near the detection device 250 such that the detection device 250 is configured to detect the device. For example, the detection device 250 may be configured to scan a relatively precise area 265 (e.g., within five feet of the detection device 250) in an environment 100 known to include a plurality of devices (e.g., public space). For another example, the detection device 250 may be configured to scan a relatively wide area 265 (e.g., within thirty feet of the detection device 250, within a line-of-sight of the detection device 250) in an environment 100 known to include relatively fewer devices (e.g., home, office).

In one embodiment, the detection device 250 periodically scans the area 265 to detect one or more devices 260 and creates a digital map based on the detected devices 260 of each scan. The detection device 250 may scan an area 265 to detect one or more computer or peripheral devices 260 in or proximate to the area 265 using any device-to-device interaction technology, such as an IP communications protocol, a RFID wireless communication technology, a Bluetooth® brand wireless technology standard, a ZigBee® brand communication protocol, a Wi-Fi® brand local area wireless computing networking technology, NFC wireless communication technology, or proprietary radio protocols (Bluetooth® is a registered trademark of Bluetooth Special Interest Group, ZigBee® is a registered trademark of the ZigBee Alliance, and Wi-Fi® is a registered trademark of the Wi-Fi Alliance). Alternatively, the detection device 250 may detect one or more computer or peripheral devices 260 in any manner that enables the environment 100 to function as described herein.

In some embodiments, the financial transaction device 240 and the detection device 250 are distinct devices. That is, in at least some embodiments, the financial transaction device 240 is different and separate from the detection device 250. Alternatively, the financial transaction device 240 and the detection device 250 may be integrated in a common device. For example, the user 245 may enter account information associated with the payment card 150 at a mobile device, which transmits an authorization request to the interface component 210 and scans an area 265 proximate to the mobile device. For another example, a financial transaction device 240 may be configured to scan an area 265 proximate to the financial transaction device 240. For yet another example, a detection device 250 may be configured to perform operations that allow the user 245 to make a payment to the merchant 120 with the payment card 150 and/or with account information associated with the payment card 150.

The authentication component 220 is configured to communicate with the interface component 210, and determine whether to authenticate a user and/or authorize a financial transaction. During an initialization stage, the authentication component 220 is configured to receive one or more identifiers 255 (e.g., initialization identifiers), and recognize or identify the one or more received identifiers 255 as one or more target identifiers 270. In at least some embodiments, the authentication component 220 generates one or more digital maps including one or more target identifiers 270. A target identifier 270 is an identifier 255 that is associated with the user 245 or a financial account 275 associated with the user 245 such that the authentication component 220 recognizes the device 260 associated with the identifier 255 as an authorized or familiar device.

During a financial transaction stage, the authentication component 220 is configured to receive one or more identifiers 255, and determine whether the one or more received identifiers 255 correspond with one or more target identifiers 270. For example, the authentication component 220 may compare one or more received identifiers 255 with a database of one or more target identifiers 270 to determine whether at least one received identifier 255 matches or corresponds with the one or more target identifiers 270. In at least some embodiments, the authentication component 220 generates one or more digital maps including one or more identifiers 255, and compares the one or more digital maps including the one or more identifiers 255 with a database of one or more digital maps including target identifiers 270.

Upon determining that the one or more received identifiers 255 correspond with the one or more target identifiers 270, the authentication component 220 is configured to authenticate the user 245 and/or authorize the financial transaction. The authentication component 220 is configured to communicate with the interface component 210 to transmit, to the financial transaction device 240 and/or the detection device 250, data indicating an approval of the financial transaction. Upon determining that the one or more received identifiers 255 does not correspond with the one or more target identifiers 270, the authentication component 220 is configured to not authenticate the user and/or decline the financial transaction. The authentication component 220 is configured to communicate with the interface component 210 to transmit, to the financial transaction device 240 and/or the detection device 250, data indicating that the user is not authenticated and/or that the financial transaction is declined.

In some embodiments, the authentication component 220 is configured to calculate a parameter associated with the one or more received identifiers 255, and compare the parameter with a predetermined threshold to determine whether to authorize or decline the financial transaction. The parameter may be indicative of an IoT device presence. For example, the authentication component 220 may determine whether a quantity (e.g., count, percentage) of identifiers 255 that correspond with the target identifiers 270 satisfies a predetermined threshold. The IoT includes a network of physical objects (e.g., devices 260) that include electronics, software, sensors, and/or connectivity to enable the physical objects to exchange data with other connected devices. In some embodiments, the device presence is associated with an existence of one or more devices 260 proximate to a detection device 250. In this manner, the device presence of devices 260 associated with one or more target identifiers 270 may be indicative of the detection device 250 being in a familiar location or environment, such as an environment including one or more devices 260 that have been previously recognized by the financial transaction processing computing device 200 and/or are expected to be in the environment.

In at least some embodiments, the authentication component 220 is configured to calculate a component parameter (e.g., a first parameter) for each identifier 255 detected by the detection device 250 or for each identifier 255 that corresponds with a target identifier 270, and determine an aggregate parameter based on the component parameters. In some embodiments, one or more component parameters are weighted based on a level of confidence or integrity associated with the identifier 255 and/or the target identifier 270. For example, an identifier 255 and/or target identifier 270 associated with a device 260 that is proximate to the user 245 a greater amount of time may be weighted more than an identifier 255 and/or target identifier 270 associated with a device 260 that is proximate to the user 245 a lesser amount of time. For another example, an identifier 255 and/or target identifier 270 associated with a device 260 that is in or proximate to a secure area with limited access may be weighted more than an identifier 255 and/or target identifier 270 associated with a device 260 that is in or proximate to a public area. In this manner, the authentication component 220 may determine whether a quality of identifiers 255 that correspond with the target identifiers 270 satisfies a predetermined threshold.

Upon determining that the parameter satisfies the predetermined threshold, the authentication component 220 is configured to authenticate the user 245 and/or authorize the financial transaction. Upon determining that the parameter does not satisfy the predetermined threshold, the authentication component 220 is configured to not authenticate the user 245 and/or decline the financial transaction.

The transfer component 230 is configured to communicate with the interface component 210 and/or the authentication component 220 to transfer funds between a plurality of financial accounts 275. For example, the transfer component 230 may transfer at least some funds to and/or from the financial account 275 based on information received from the user 245 (e.g., received via the interface component 210). For another example, the transfer component 230 may communicate with the authentication component 220 such that the transfer component 230 transfers at least some funds to and/or from the financial account 275 upon determining that the one or more received identifiers 255 correspond with the one or more target identifiers 270.

In some embodiments, the transfer component 230 is configured to transfer funds between a plurality of financial accounts 275 maintained at or by the financial transaction processing computing device 200. For example, the transfer component 230 may transfer funds from the cardholder's financial account 275 maintained at or by the financial transaction processing computing device 200 to another financial account 275 maintained at or by the financial transaction processing computing device 200. Additionally or alternatively, the transfer component 230 is configured to communicate with another computing device 280 (e.g., another financial transaction processing computing device) to transfer funds between a financial account 275 maintained at or by the financial transaction processing computing device 200 and a financial account 285 maintained at or by the other computing device 280. For example, the transfer component 230 may transfer funds from the cardholder's financial account 275 maintained at or by the financial transaction processing computing device 200 to another financial account 285 maintained at or by the other computing device 280.

Figure 3:
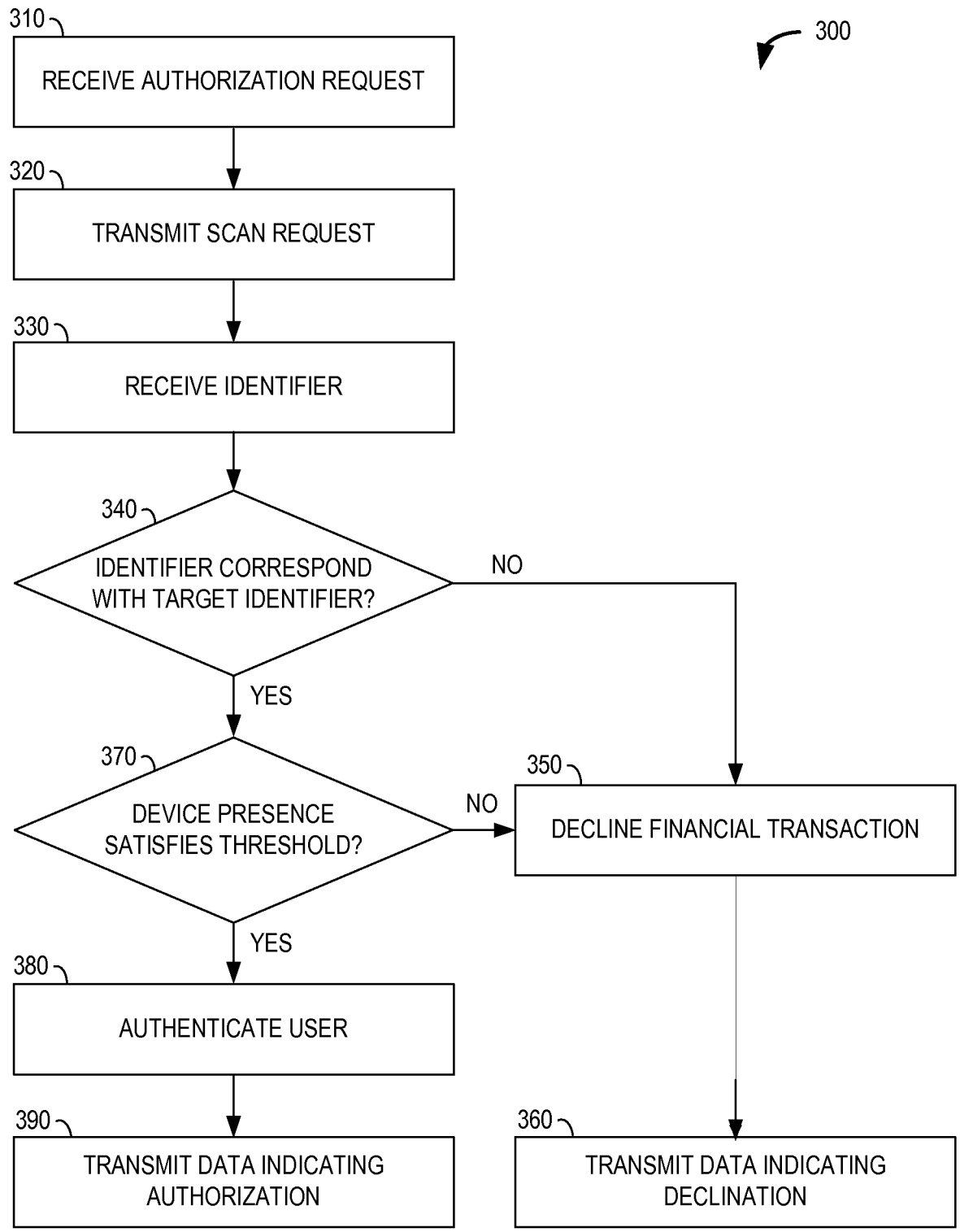
FIG. 3 is a flowchart of an example method of processing a financial transaction in an environment, such as the environment shown in FIG. 1.

FIG. 3 is a flowchart of an example method 300 of processing a financial transaction in the environment 100 (shown in FIG. 1) using the financial transaction processing computing device 200 (shown in FIG. 2). In at least some embodiments, the financial transaction processing computing device 200 receives a request to authorize a financial transaction at 310 and, upon receiving the request to authorize the financial transaction, transmits a request to scan an area 265 proximate to a detection device 250 at 320. In one embodiment, the request to authorize the financial transaction is transmitted from a financial transaction device 240. Alternatively, the request to authorize the financial transaction may be transmitted from the detection device 250.

The financial transaction processing computing device 200 receives one or more identifiers 255 that are associated with one or more devices 260 detected by the detection device 250 at 330. The financial transaction processing computing device 200 determines whether the one or more received identifiers 255 correspond with one or more target identifiers 270 at 340. If the one or more received identifiers 255 do not correspond with one or more target identifiers 270, then the financial transaction processing computing device 200 does not authenticate a user 245 and/or declines the request to authorize the financial transaction at 350 and transmits data identifying the user 245 as unauthorized and/or indicating the declination at 360.

If the one or more received identifiers 255 correspond with one or more target identifiers 270, then the financial transaction processing computing device 200 determines whether a device presence of the one or more devices 260 associated with the one or more received identifiers 255 satisfies a predetermined threshold at 370. In some embodiments, the financial transaction processing computing device 200 calculates a parameter associated with the one or more received identifiers 255, and compares the parameter with a predetermined threshold. In at least some embodiments, the parameter includes or is calculated based on a plurality of component parameters associated with a plurality of identifiers 255. If the device presence of the one or more devices 260 does not satisfy the predetermined threshold, then the financial transaction processing computing device 200 does not authenticate the user 245 and/or declines the request to authorize the financial transaction at 350 and transmits data identifying the user 245 as unauthorized and/or indicating the declination at 360.

If the device presence of the one or more devices 260 satisfies the predetermined threshold, then the financial transaction processing computing device 200 authenticates the user 245 and/or authorizes the financial transaction at 380 by approving the request and transmits data authorizing the user 245 and/or indicating the authorization at 390.

Figure 4:
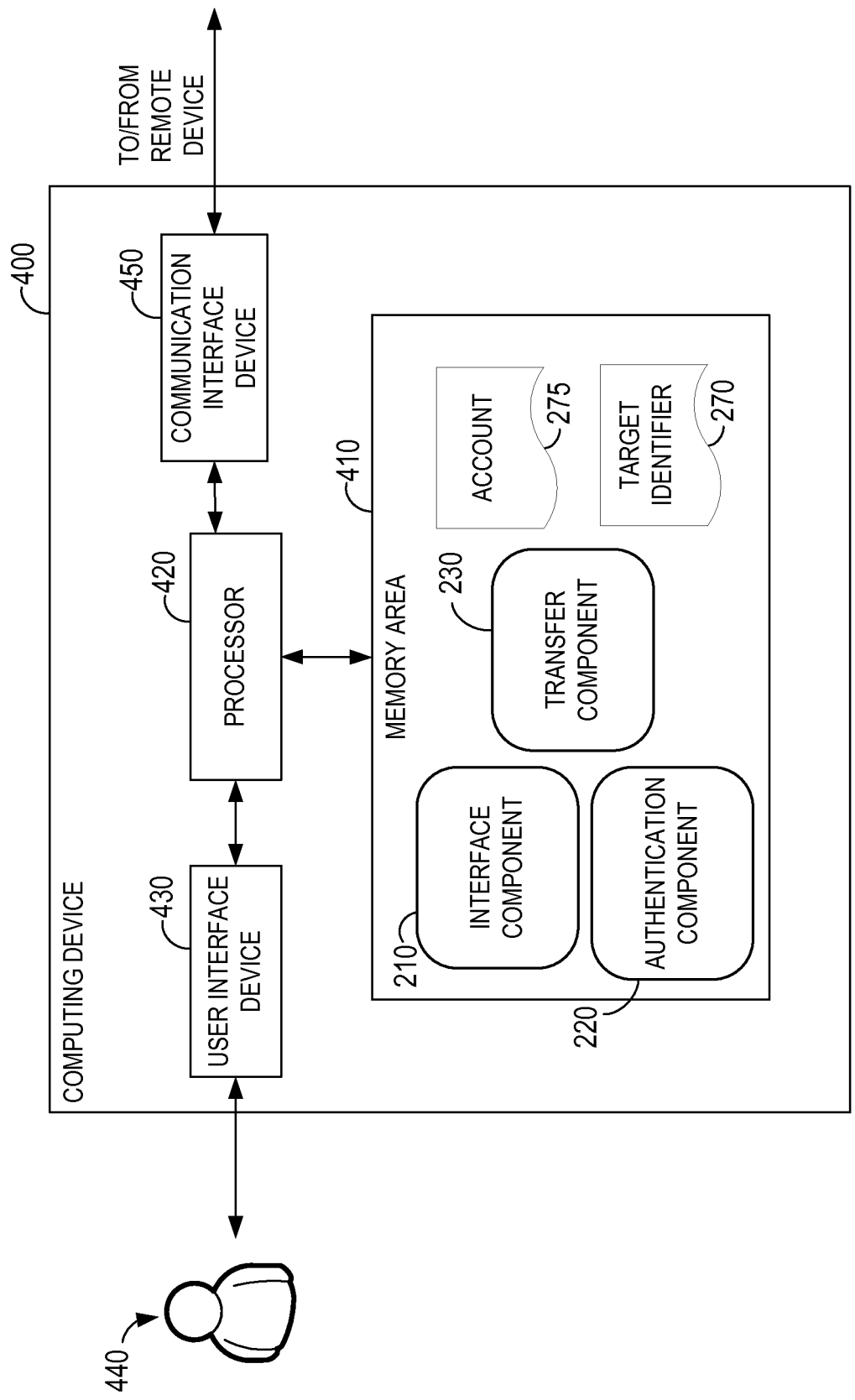
FIG. 4 is a block diagram illustrating an example computing device that may be used to authenticating a user in an environment, such as the environment shown in FIG. 1.

FIG. 4 is a block diagram illustrating an example computing device 400 that may be used to process financial transactions in the environment 100 (shown in FIG. 1). While some embodiments of the disclosure are illustrated and described herein with reference to the computing device 400 being or including a financial transaction processing computing device 200 (shown in FIG. 2), a financial transaction device 240 (shown in FIG. 2), a detection device 250 (shown in FIG. 2), a detected device 260 (shown in FIG. 2), and/or a computing device 280 (shown in FIG. 2), aspects of the disclosure are operable with any computing device that executes instructions to implement the operations and functionality associated with the computing device 400.

For example, the computing device 400 may include a mobile device, a mobile telephone, a phablet, a tablet, a portable media player, a netbook, a laptop, a desktop computer, a computing pad, a kiosk, a tabletop device, an industrial control device, and other computing devices. Additionally, the computing device 400 may represent a group of processing units or other computing devices. Additionally, any computing device described herein may be configured to perform any operation described herein including one or more operations described herein as being performed by another computing device.

The computing device 400 includes one or more computer-readable media, such as a memory area 410 storing computer-executable instructions, an interface component 210, an authentication component 220, a transfer component 230, one or more target identifiers 270, one or more financial accounts 275, account information, merchant information, financial institution information, purchase information, and other data, and one or more processors 420 programmed to execute the computer-executable instructions for implementing aspects of the disclosure. The memory area 410 includes any quantity of media associated with or accessible by the computing device 400. The memory area 410 may be internal to the computing device 400 (as shown in FIG. 4), external to the computing device 400 (not shown), or both (not shown).

The processor 420 includes any quantity of processing units, and the instructions may be performed by the processor 420 or by multiple processors within the computing device 400 or performed by a processor external to the computing device 400. The processor 420 is programmed to execute instructions such as those illustrated in the figures (e.g., FIGS. 3, 6, 7, 9, and/or 10).

Upon programming or execution of these instructions, the processor 420 is transformed into a special purpose microprocessor or machine. For example, the interface component 210, when executed by the processor 420, causes the processor 420 to receive one or more identifiers 255 associated with one or more devices 260 in an area 265 proximate to a detection device 250; the authentication component 220, when executed by the processor 420, causes the processor 420 to determine whether at least one identifier 255 corresponds with one or more target identifiers 270, determine whether a device presence of at least one device 260 satisfies a predetermined threshold, and authenticate a user 245 and/or authorize a financial transaction; and the transfer component 230, when executed by the processor 420, causes the processor 420 to transfer a portion of a financial account 275 to another financial account 275 or 285. Although the processor 420 is shown separate from the memory area 410, embodiments of the disclosure contemplate that the memory area 410 may be onboard the processor 420 such as in some embedded systems.

The computing device 400 includes at least one user interface 430 for exchanging data between the computing device 400 and a user 440 (e.g., cardholder 160). For example, the user interface 430 includes or is coupled to a presentation device configured to present information, such as text, images, audio, video, graphics, alerts, and the like, to the user 440. The presentation device may include, without limitation, a display, a speaker, or a vibrating component. Additionally or alternatively, the user interface 430 includes or is coupled to an input device (not shown) configured to receive information, such as user commands, from the user 440. The input device may include, without limitation, a controller, a camera, a microphone, or an accelerometer. In at least some embodiments, the presentation device and the input device are integrated in a common user interface 430 configured to present information to the user 440 and receive information from the user 440. For example, the user-interface device may include, without limitation, a capacitive touch screen display or a controller including a vibrating component. In some embodiments, the user 440 may interface with the computing device 400 via another computing device.

The computing device 400 includes at least one communication interface 450 for exchanging data between the computing device 400 and a computer-readable media or another computing device. For example, the computing device 400 may be coupled to a server, a financial transaction processing computing device, a financial transaction device (e.g., a POS terminal), a detection device, and/or a detected device via a network and/or the Internet. Communication between the computing device 400 and a computer-readable media or another computing device may occur using any protocol or mechanism over any wired or wireless connection.

The block diagram of FIG. 4 is merely illustrative of an example system that may be used in connection with one or more embodiments of the disclosure and is not intended to be limiting in any way. Further, peripherals or components of the computing devices known in the art are not shown, but are operable with aspects of the disclosure. At least a portion of the functionality of the various elements in FIG. 4 may be performed by other elements in FIG. 4, or an entity (e.g., processor, web service, server, applications, computing device, etc.) not shown in FIG. 4.

Figure 5:
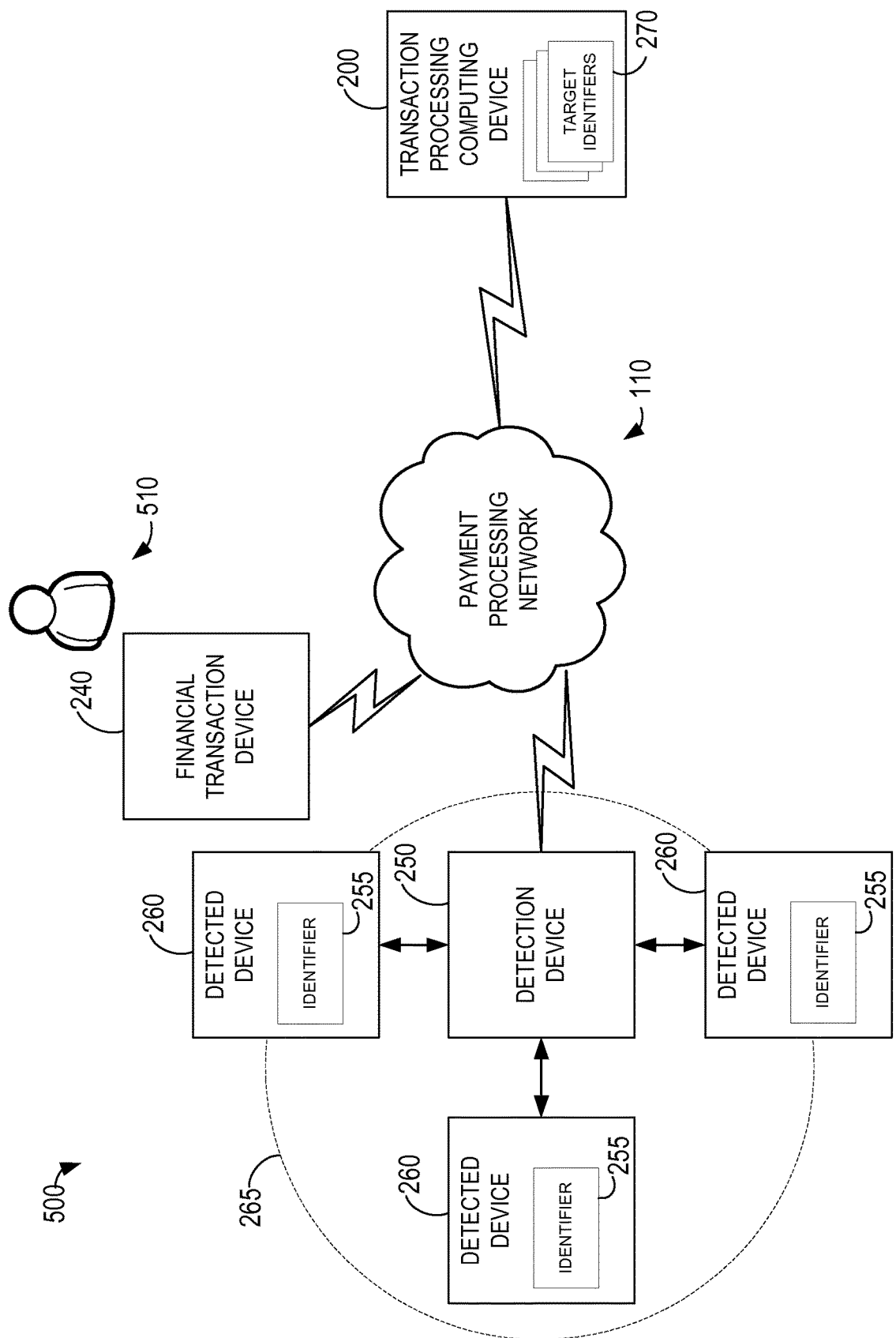
FIG. 5 is a block diagram illustrating an example system for authenticating a user in an environment, such as the environment shown in FIG. 1.

FIG. 5 is a block diagram illustrating an example system 500 for authenticating a user 245 and/or authorizing a financial transaction in an environment 100 (shown in FIG. 1). In some embodiments, the system 500 includes a financial transaction processing computing device 200 associated with an issuer 140. Alternatively, the financial transaction processing computing device 200 may be associated with any entity that enables the environment 100 to function as described herein. The financial transaction processing computing device 200 stores or maintains one or more target identifiers 270.

The system 500 includes a financial transaction device 240 coupled to the financial transaction processing computing device 200 via a processing network 110. The financial transaction device 240 allows a user 510 (e.g., a cardholder 160) to make a payment to a merchant 120 with a payment card 150 and/or with account information associated with the payment card 150.

The system 500 also includes a detection device 250 that is coupled to the financial transaction processing computing device 200 via a processing network 110. The detection device 250 scans an area 265 proximate to the detection device 250 for one or more devices 260. For example, the detection device 250 may detect a garage door opener, a mobile phone, a Wi-Fi router, and/or a light. Although three devices 260 are illustrated in FIG. 5, the system 500 may include any quantity of devices 260 in the area 265 proximate to the detection device 250, including the financial transaction device 240.

FIG. 6 is an example sequence diagram that may be implemented using the system 500 during an initialization stage. As shown in FIG. 6, the detection device 250 scans the area 265 for one or more devices 260, identifies one or more identifiers 255 associated with the one or more scanned devices 260, and transmits the one or more identifiers 255 to the financial transaction processing computing device 200. The financial transaction processing computing device 200 receives the one or more identifiers 255 (e.g., initialization identifiers) from the detection device 250 and identifies the one or more received identifiers 255 as one or more target identifiers 270.

In some embodiments, the initialization stage is performed for one or more settings. For example, one or more first identifiers 255 associated with one or more "smart" or "connected" home devices 260 (e.g., a garage door opener, a mobile phone, a Wi-Fi router, and/or a light) may be recognized or identified as one or more first target identifiers 270 in a home setting, and one or more second identifiers 255 associated with one or more connected office devices 260 (e.g., a printer, a mobile phone, a Wi-Fi router, and/or a light) may be recognized or identified as one or more second target identifiers 270 in an office setting. In this manner, a device presence may be determined in light of a setting associated with the cardholder 160 and/or detection device 250.

FIG. 7 is an example sequence diagram that may be implemented using the system 500 during a financial transaction stage. As shown in FIG. 7, the financial transaction device 240 receives a financial transaction request, and transmits, to the financial transaction processing computing device 200, an authorization request to authorize a financial transaction.

The financial transaction processing computing device 200 receives the authorization request, and transmits, to the detection device 250, a scan request to scan the area 265 proximate to the detection device 250. The detection device 250 receives the scan request from the financial transaction processing device 200, scans the area 265 for one or more devices 260, identifies one or more identifiers 255 associated with the one or more scanned devices 260, and transmits the one or more identifiers 255 to the financial transaction processing computing device 200.

The financial transaction processing computing device 200 receives the one or more identifiers 255 from the detection device 250, and determines whether the one or more received identifiers 255 correspond with one or more target identifiers 270 and/or whether a device presence of the one or more devices 260 satisfies a predetermined threshold. In this manner, the financial transaction processing computing device 200 may determine whether the detection device 250 is in a familiar location or environment. In some embodiments, the financial transaction processing computing device 200 calculates a parameter associated with the one or more received identifiers 255, and compares the parameter with a predetermined threshold. In at least some embodiments, the parameter includes or is calculated based on a plurality of component parameters associated with a plurality of identifiers 255.

Upon determining that the one or more received identifiers 255 correspond with one or more target identifiers 270 and/or that the device presence of the one or more devices 260 satisfies the predetermined threshold, the financial transaction processing computing device 200 authenticates the user 245 and/or authorizes the financial transaction, and transmits data indicating the authentication and/or authorization to the financial transaction device 240. The financial transaction device 240 receives the data indicating the authentication and/or authorization from the financial transaction processing computing device 200, and processes the financial transaction request.

In at least some embodiments, the financial transaction device 240 (e.g., a POS terminal) transmits an identifier 255 associated with the financial transaction device 240 to the financial transaction processing computing device 200, and the financial transaction device identifier 255 is recognized or identified as a target identifier 270. In this manner, the financial transaction processing computing device 200 may determine whether the detection device 250 (e.g., a mobile device) is proximate to the financial transaction device 240 when determining a device presence.

Figure 8:
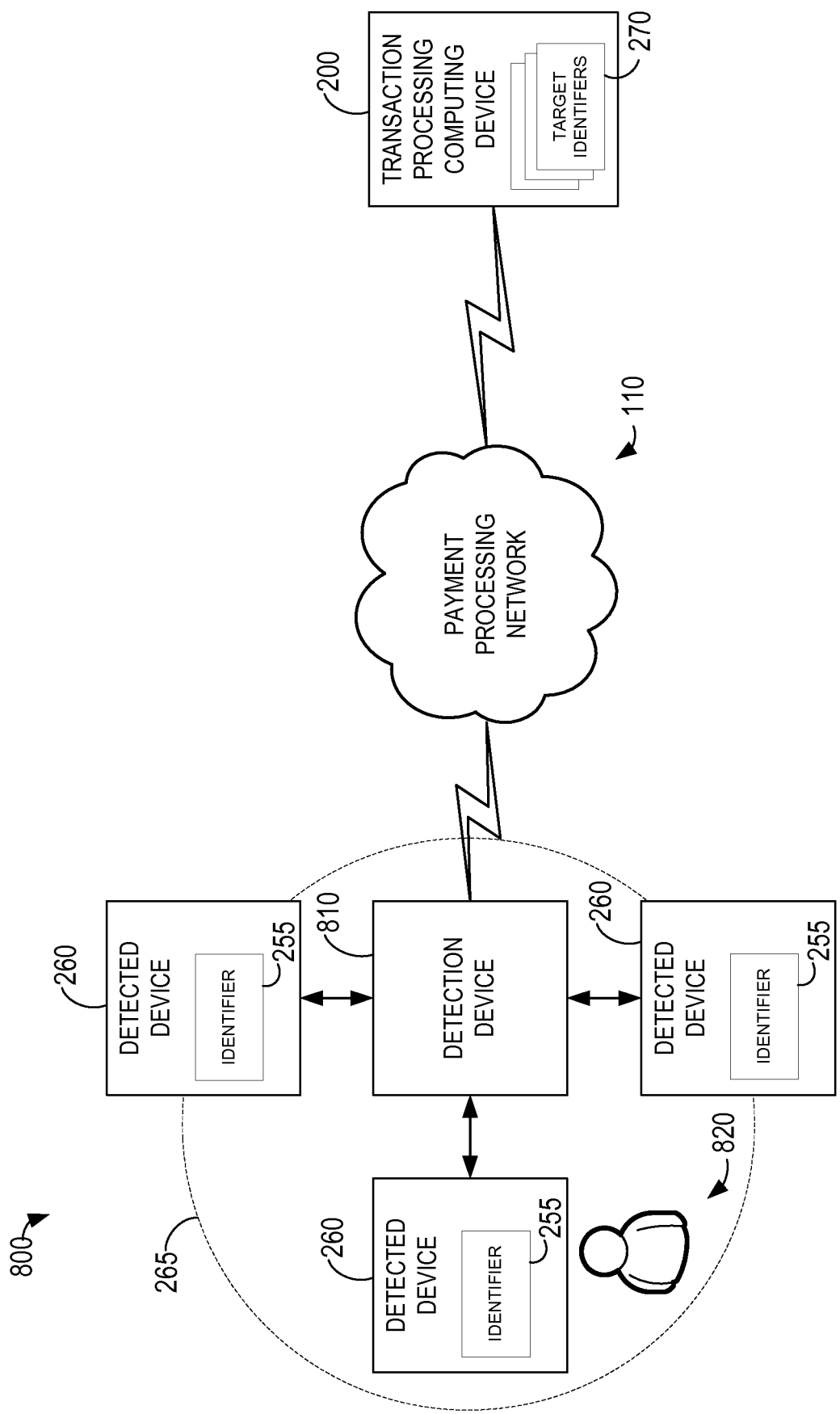
FIG. 8 is a block diagram illustrating an example system for authenticating a user in an environment, such as the environment shown in FIG. 1.

FIG. 8 is a block diagram illustrating an example system 800 for authenticating a user 245 and/or authorizing a financial transaction in an environment 100 (shown in FIG. 1). Similar to the system 500, the system 800 includes a financial transaction processing computing device 200 associated with an issuer 140. Alternatively, the financial transaction processing computing device 200 may be associated with any entity that enables the environment 100 to function as described herein. The financial transaction processing computing device 200 stores or maintains one or more target identifiers 270.

The system 800 includes a detection device 810 coupled to the financial transaction processing computing device 200 via a processing network 110. Unlike the detection device 250, the detection device 810 integrates functionalities of the financial transaction device 240 and the detection device 250 (e.g., a mobile device). That is, the detection device 810 allows a user 820 (e.g., a cardholder 160) to make a payment to a merchant 120 with a payment card 150 and/or with account information associated with the payment card 150. Additionally, the detection device 810 scans an area 265 proximate to the detection device 810 for one or more devices 260. For example, the detection device 810 may detect a garage door opener, a mobile phone, a Wi-Fi router, and/or a light. Although three devices 260 are illustrated in FIG. 8, the system 800 may include any quantity of devices 260 in the area 265 proximate to the detection device 810.

FIGS. 9 and 10 are example sequence diagrams that may be implemented using the system 800. The sequence diagrams illustrated in FIGS. 9 and 10 include similar operations as the sequence diagrams illustrated in FIGS. 6 and 7, respectively. Unlike the sequence diagrams illustrated in FIGS. 6 and 7, the sequence diagrams in FIGS. 9 and 10 include two parties: the financial transaction computing device 200 and the detection device 810.

FIG. 9 is an example sequence diagram that may be implemented using the system 800 during an initialization stage. As shown in FIG. 9, the detection device 810 scans the area 265 for one or more devices 260, identifies one or more identifiers 255 associated with the one or more scanned devices 260, and transmits the one or more identifiers 255 to the financial transaction processing computing device 200. The financial transaction processing computing device 200 receives the one or more identifiers 255 from the detection device 810 and identifies the one or more received identifiers 255 as one or more target identifiers 270. Similar to the system 500, the initialization stage may be performed for one or more settings.

FIG. 10 is an example sequence diagram that may be implemented using the system 500 during a financial transaction stage. As shown in FIG. 7, the detection device 810 receives a financial transaction request, and transmits an authorization request to authorize a financial transaction to the financial transaction processing computing device 200.

The financial transaction processing computing device 200 receives the authorization request, and transmits, to the detection device 810, a scan request to scan the area 265 proximate to the detection device 810. The detection device 810 receives the scan request from the financial transaction processing device 200, scans the area 265 for one or more devices 260, identifies one or more identifiers 255 associated with the one or more scanned devices 260, and transmits the one or more identifiers 255 to the financial transaction processing computing device 200. In at least some embodiments, the detection device 810 scans the area 265 prior to transmitting the authorization request, and transmits the one or more identifiers 255 to the financial transaction processing computing device 200 with the authorization request or temporally proximate (e.g., close in time) to the transmission of the authorization request.

The financial transaction processing computing device 200 receives the one or more identifiers 255 from the detection device 810, and determines whether the one or more received identifiers 255 correspond with one or more target identifiers 270 and/or whether a device presence of the one or more devices 260 associated with the received identifiers 255 satisfies a predetermined threshold. In some embodiments, the financial transaction processing computing device 200 calculates a parameter associated with the one or more received identifiers 255, and compares the parameter with a predetermined threshold. In at least some embodiments, the parameter includes or is calculated based on a plurality of component parameters associated with a plurality of identifiers 255.

Upon determining that the one or more received identifiers 255 correspond with one or more target identifiers 270 and/or that the device presence of the one or more devices 260 satisfies the predetermined threshold, the financial transaction processing computing device 200 authenticates the user 245 and/or authorizes the financial transaction, and transmits data indicating the authentication and/or authorization to the detection device 810. The detection device 810 receives the data indicating the authentication and/or authorization from the financial transaction processing computing device 200, and processes the financial transaction request.

The subject matter described herein enables a user to be authenticated and/or a financial transaction to be authorized based on a device presence of one or more devices. The embodiments described herein provide security for financial transactions and increase a reliability of financial transaction data.

Example computer-readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Example computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an example computing system environment, embodiments of the disclosure are capable of implementation with numerous other general purpose or special purpose computing system environments, configurations, or devices.

Embodiments of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, earphones, and the like), network PCs, minicomputers, mainframe computers, distributed computing environments that include any of the above systems or devices, and the like. Such systems or devices may accept input from the cardholder in any way, including from input devices such as a keyboard or pointing device, via gesture input, proximity input (such as by hovering), and/or via voice input.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

The embodiments illustrated and described herein as well as embodiments not specifically described herein but within the scope of aspects of the disclosure constitute example means for authenticating a user and/or authorizing a financial transaction. For example, the elements illustrated in FIG. 1, 2, 4, 5, or 8 such as when encoded to perform the operations illustrated in FIG. 3, 6, 7, 9, or 10 constitute at least an example means for receiving one or more identifiers associated with one or more devices in an area proximate to a detection device, an example means for determining whether at least one identifier corresponds with one or more target identifiers, an example means for determining whether a device presence satisfies a predetermined threshold, and/or an example means for authenticating a user and/or authorizing the financial transaction.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other embodiments described herein, embodiments include any combination of the following:

receiving an authorization request to authorize a financial transaction;

transmitting, to the detection device, a scan request to scan the area proximate to the detection device;

receiving, from a financial transaction device, an authorization request to authorize the financial transaction, the authorization request including a transaction device identifier associated with the financial transaction device, the financial transaction device different from the detection device;

transmitting, to the detection device, a scan request to scan the area proximate to the detection device;

receiving, from the detection device, an authorization request to authorize the financial transaction;

transmitting, to the detection device, a scan request to scan the area proximate to the detection device;

identifying the transaction device identifier as a target identifier of the one or more target identifiers;

receiving one or more initialization identifiers;

identifying the one or more initialization identifiers as the one or more target identifiers;

receiving, from a detection device, one or more identifiers, the one or more identifiers associated with one or more devices in an area proximate to the detection device;

determining, at a financial transaction processing computing device, whether at least one identifier of the one or more identifiers correspond with one or more target identifiers;

determining, at the financial transaction processing computing device, whether a device presence of at least one device of the one or more devices associated with the at least one identifier satisfies a predetermined threshold;

calculating a parameter associated with the at least one identifier;

determining whether the calculated parameter satisfies the predetermined threshold;

calculating a first parameter associated with a first identifier of the one or more identifiers, wherein the parameter is calculated based on the first parameter, and the first parameter is weighted based on a first target identifier of the one or more target identifiers corresponding with the first identifier;

authenticating a cardholder for the financial transaction;

transmitting, to the financial transaction device, data indicating an authorization of the financial transaction; and transmitting, to the detection device, data indicating an authorization of the financial transaction.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various embodiments with their associated operations, a person skilled in the art would appreciate that a combination of operations from any number of different embodiments is also within scope of the aspects of the disclosure.

What is claimed is:

1. A computer-implemented method for authenticating a cardholder for a financial transaction, the computer-implemented method comprising:
   receiving, at a financial transaction processing computing device, from a computing device associated with the cardholder, a request to authenticate the cardholder for the financial transaction;
   based on the received request, communicating with a detection device to provide data associated with one or more devices recognized by the financial transaction processing computing device as authorized devices, and receiving, from the detection device, a plurality of identifiers, the plurality of received identifiers being associated with a plurality of devices present in an area proximate to the detection device;
   calculating a parameter associated with the plurality of received identifiers, the parameter representing a quantity of the plurality of received identifiers, and comparing the calculated parameter with a first defined quantity of identifiers;
   determining, based on the comparing, that the calculated parameter exceeds the first defined quantity;
   determining, at the financial transaction processing computing device, whether at least one of the plurality of received identifiers corresponds with one or more target identifiers, the one or more target identifiers being associated with the one or more devices recognized by the financial transaction processing computing device;
   upon determining that the at least one of the plurality of received identifiers corresponds with the one or more target identifiers, determining, at the financial transaction processing computing device, whether a quantity of the plurality of devices present in the area, and associated with the at least one of the plurality of received identifiers, exceeds a second defined quantity of devices; and
   upon determining that the quantity of the plurality of devices exceeds the second defined quantity, authenticating the cardholder for the financial transaction.

2. The computer-implemented method of claim 1, wherein communicating with the detection device comprises transmitting, to the detection device, a scan request to scan the area proximate to the detection device for the plurality of devices in the area proximate to the detection device.

3. The computer-implemented method of claim 1, wherein the parameter is calculated based on a plurality of component parameters associated with the plurality of received identifiers.

4. The computer-implemented method of claim 1, further comprising:
   receiving one or more initialization identifiers; and
   identifying the one or more initialization identifiers as the one or more target identifiers.

5. The computer-implemented method of claim 3, wherein the component parameters are weighted based on a level of confidence associated with the plurality of received identifiers before comparing the calculated parameter with the first defined quantity.

6. The computer-implemented method of claim 5, wherein weighting the component parameters based on the level of confidence includes weighting an identifier associated with a device that remains proximate to the cardholder for a greater amount of time more than an identifier associated with a device that remains proximate to the cardholder for a lesser amount of time.

7. The computer-implemented method of claim 1, further comprising:
   receiving, from a financial transaction device, an authorization request to authorize the financial transaction, the authorization request including a transaction device identifier associated with the financial transaction device, the financial transaction device different from the detection device;
   upon receiving the authorization request, transmitting, to the detection device, a scan request to scan the area proximate to the detection device;
   identifying the transaction device identifier as a target identifier of the one or more target identifiers; and
   upon authenticating the cardholder for the financial transaction, transmitting, to the financial transaction device, data indicating an authorization of the financial transaction.

8. The computer-implemented method of claim 1, further comprising:
   receiving, from the detection device, an authorization request to authorize the financial transaction;
   upon receiving the authorization request, transmitting, to the detection device, a scan request to scan the area proximate to the detection device; and
   upon authenticating the cardholder for the financial transaction, transmitting, to the detection device, data indicating an authorization of the financial transaction.

9. A computing device configured to authenticate a cardholder for a financial transaction, the computing device comprising:
   a memory storing one or more target identifiers and computer-executable instructions; and
   a processor configured to execute the computer-executable instructions to:
      receive, from a device associated with the cardholder, a request to authenticate the cardholder for the financial transaction;
      based on the received request, communicate with a detection device to provide data associated with one or more devices recognized by a financial transaction processing computing device as authorized devices, and receive, from the detection device, a plurality of identifiers, the plurality of received identifiers being associated with a plurality of devices present in an area proximate to the detection device;

calculate a parameter associated with the plurality of received identifiers, the parameter representing a quantity of the plurality of received identifiers, and comparing the calculated parameter with a first defined quantity of identifiers;

determine, based on the comparing, that the calculated parameter exceeds the first defined quantity;

determine whether at least one of the plurality of received identifiers corresponds with the one or more target identifiers, the one or more target identifiers being associated with the one or more devices recognized by the financial transaction processing computing device;

upon determining that the at least one of the plurality of received identifiers corresponds with the one or more target identifiers, determine whether a quantity of the plurality of devices present in the area, and associated with the at least one of the plurality of received identifiers, exceeds a second defined quantity of devices;

upon determining that the quantity of the plurality of devices exceeds the second defined quantity, authenticate the cardholder for the financial transaction; and upon authenticating the cardholder for the financial transaction, transmit data indicating an authorization of the financial transaction.

10. The computing device of claim 9, wherein the parameter is calculated based on a plurality of component parameters associated with the plurality of received identifiers.

11. The computing device of claim 9, wherein the processor is further configured to execute the computer-executable instructions to:

receive one or more initialization identifiers; and identify the one or more initialization identifiers as the one or more target identifiers.

12. The computing device of claim 10, wherein the component parameters are weighted based on a level of confidence associated with the plurality of received identifiers before comparing the calculated parameter with the first defined quantity.

13. The computing device of claim 12, wherein weighting the component parameters based on the level of confidence includes weighting an identifier associated with a device that remains proximate to the cardholder for a greater amount of time more than an identifier associated with a device that remains proximate to the cardholder for a lesser amount of time.

14. The computing device of claim 9, wherein the processor is further configured to execute the computer-executable instructions to:

receive, from a financial transaction device, an authorization request to authorize the financial transaction, the authorization request including a transaction device identifier associated with the financial transaction device, the financial transaction device different from the detection device;

upon receiving the authorization request, transmit, to the detection device, a scan request to scan the area proximate to the detection device; and identify the transaction device identifier as a target identifier of the one or more target identifiers, wherein the data indicating the authorization of the financial transaction is transmitted to the financial transaction device.

15. The computing device of claim 9, wherein the processor is further configured to execute the computer-executable instructions to:

receive, from the detection device, an authorization request to authorize the financial transaction; and upon receiving the authorization request, transmit, to the detection device, a scan request to scan the area proximate to the detection device, wherein the data indicating the authorization of the financial transaction is transmitted to the detection device.

16. A computer-readable storage device having computer-executable instructions embodied thereon, wherein, upon execution by at least one processor, the computer-executable instructions cause the processor to:

receive an authorization request from a cardholder to authorize a financial transaction;

upon receiving the authorization request, transmit, to a detection device, a request to provide data associated with one or more devices recognized by a financial transaction processing computing device as authorized devices based on the request, receive from the detection device, a plurality of identifiers associated with a plurality of devices present in an area proximate to the detection device;

calculate a parameter associated with the plurality of received identifiers, the parameter representing a quantity of the plurality of received identifiers, and comparing the calculated parameter with a first defined quantity of identifiers;

determine, based on the comparing, that the calculated parameter exceeds the first defined quantity;

determine whether at least one of the plurality of received identifiers corresponds with one or more target identifiers, the one or more target identifiers being associated with the one or more devices recognized by the financial transaction processing computing device;

upon determining that at least one of the plurality of received identifiers corresponds with the one or more target identifiers, determine whether a quantity of the plurality of devices present in the area, and associated with the at least one of the plurality of received identifiers, exceeds a second defined quantity of devices; and upon determining that the quantity of the plurality of devices exceeds the second defined quantity, authenticate the cardholder for the financial transaction.

17. The computer-readable storage device of claim 16, wherein, upon execution by the at least one processor, the computer-executable instructions further cause the processor to:

identify a transaction device identifier associated with a financial transaction device as a target identifier of the one or more target identifiers, wherein the authorization request is received from the financial transaction device, the authorization request includes the transaction device identifier, and the financial transaction device is different from the detection device; and upon authenticating a cardholder for the financial transaction, transmit, to the financial transaction device, data indicating an authorization of the financial transaction.

18. The computer-readable storage device of claim 16, wherein the parameter is calculated based on a plurality of component parameters associated with the plurality of received identifiers.

19. The computer-readable storage device of claim 18, wherein the component parameters are weighted based on a level of confidence associated with the plurality of received identifiers before comparing the calculated parameter with the first defined quantity.

20. The computer-readable storage device of claim 19, wherein weighting the component parameters based on the level of confidence includes weighting an identifier associated with a device that remains proximate to the cardholder for a greater amount of time more than an identifier associated with a device that remains proximate to the cardholder for a lesser amount of time.

* * * * *